US009792652B2

(12) United States Patent
Johnson et al.

(10) Patent No.: US 9,792,652 B2
(45) Date of Patent: Oct. 17, 2017

(54) USER INTERFACE FOR COMPUTER-IMPLEMENTED TRADING SYSTEM

(71) Applicant: Broadway Technology LLC, New York, NY (US)

(72) Inventors: Bill Johnson, Austin, TX (US); Tyler Moeller, New York, NY (US); David Meeker, Austin, TX (US); Joshua Walsky, Hoboken, NJ (US)

(73) Assignee: BROADWAY TECHNOLOGY LLC, New York,, NY (US)

( * ) Notice: Subject to any disclaimer, the term of this patent is extended or adjusted under 35 U.S.C. 154(b) by 0 days.

(21) Appl. No.: 13/734,664

(22) Filed: Jan. 4, 2013

(65) Prior Publication Data

US 2013/0173445 A1    Jul. 4, 2013

Related U.S. Application Data

(60) Provisional application No. 61/583,159, filed on Jan. 4, 2012.

(51) Int. Cl.
*G06Q 40/04* (2012.01)
(52) U.S. Cl.
CPC .................... *G06Q 40/04* (2013.01)
(58) Field of Classification Search
CPC ...................................... G06Q 40/00
USPC ........................................................ 705/37
See application file for complete search history.

(56) References Cited

U.S. PATENT DOCUMENTS

| 6,278,982 | B1* | 8/2001 | Korhammer | G06Q 40/06 705/36 R |
| 7,890,416 | B2* | 2/2011 | Kirwin | G06F 3/04895 705/37 |
| 2003/0033212 | A1* | 2/2003 | Sandhu | G06Q 30/0601 705/26.1 |
| 2004/0263475 | A1* | 12/2004 | Wecker | G06F 3/04812 345/157 |
| 2010/0125534 | A1* | 5/2010 | Brandes | G06Q 10/04 705/36 R |
| 2011/0093379 | A1* | 4/2011 | Lane | G06Q 40/04 705/37 |
| 2011/0179472 | A1* | 7/2011 | Ganesan | G06F 21/42 726/6 |

* cited by examiner

*Primary Examiner* — Kirsten Apple
(74) *Attorney, Agent, or Firm* — Leason Ellis LLP

(57) ABSTRACT

A system and method are disclosed. A GUI is provided that includes at least one interactive location of a trading screen. The location corresponds to a tradeable object. A graphical object is populated with data relating to a current market condition, and the object is populated on the basis of a respective location in the trading screen. The GUI object is presented in the graphical user interface, at the respective location in the trading screen such that the GUI object presents a portion of the populated data centered around the respective location. A tactile input action associated with the object is received in the GUI, and the trade instruction is caused to be constructed that is associated with the GUI object and the received single-click action. Further, the trade instruction is transmitted to at least one computing device that is configured to execute the trade instruction.

38 Claims, 12 Drawing Sheets

USER INTERFACE FOR COMPUTER-IMPLEMENTED TRADING SYSTEM

FIELD

The present invention concerns computer-implemented trading systems. In particular, the present invention concerns user interface components that dynamically provide a set of options arranged to facilitate rapid transaction entry and processing.

BACKGROUND

Electronic exchanges utilize established rules and regulations in furtherance of trades between buyers and sellers. Electronic exchanges operate by an electronic or telecommunications network to facilitate trading in an efficient, versatile, and functionally rich way. The volume on electronic exchanges has grown over the years and at present dwarfs the volume traded on historical open outcry exchanges in which buyers and sellers physically meet on the floor to trade.

An electronic exchange generally sends messages to traders over a communication link. The data, in a raw form, sometimes include things like an opening price, the price of the last trade, the quantity of the last trade, quantity available at the best sell price, quantity available at the best buy price, quantity available at additional buy and sell prices, and the closing price. Of course, an electronic exchange can include more or fewer items, often depending on the type of tradeable object or the type of exchange. Typically, the messages vary in size depending on the content carried by them, but at the receiving end, software is programmed to understand the messages and act out certain operations.

One particular, yet important, operation is preparing the information for display to the trader. The trading screen can be the only direct connection a trader has with the internal workings of an exchange. Many systems that have been used in the financial sector have had data on a trading screen generally consistent with the manner in which it was received from the exchange without much customization or formatting. Because of the simplicity of such display schemes, the screens could be updated very quickly for a large number of tradeable objects. However, this has been at the expense of a non-intuitive design.

More recently, attention has been given to adapting trading screens to the intended use. For instance, more attention has been given to analyzing what makes an effective trading screen, thereby resulting in the design of more intuitive displays and quicker order entry systems. Depending on the actual formatting and layout, however, some trading screens have enjoyed a better reception among traders than others in conveying market information.

To develop an effective and intuitive screen, the developer should have an understanding and an appreciation for those who trade. More times than not, spotting an opportunity in a market and capitalizing on it before the competition can separate those traders who are successful from those traders who are not. An important component in capitalizing on an opportunity involves the efficient assimilation and processing of market information by the trader, in addition to reacting more quickly than other competing market participants.

It is with respect to these and other considerations that the disclosure made herein is presented.

SUMMARY

One aspect of the subject matter described in this specification can be embodied in methods that include interacting with a portion of a trading screen at a given location that corresponds to a tradeable object of interest to the user, dynamically populating a GUI object with data relating to a current market condition of the tradeable object on the basis of the location, presenting the GUI object on the screen at the location, the GUI object presenting on the trading screen at least a portion of the dynamically populated data centered around the location, permitting the user to interact with the so-presented GUI object by a single-click action or its equivalent so as to cause a trade instruction to be constructed in which the trade instruction includes a price and a Buy- or Sell-side selected in view of the location on the display of the area of interest and a size (quantity) by the interaction with the GUI object.

In further aspects, the GUI object can have a symmetrical arrangement of single-click actions. For instance, the actions can be bid or ask choices at 1, 5, 10, and 25 size intervals. The number of petal nodes can be variable, and a petal node can be highlighted to indicate which action will be taken when the user completes the interaction with the GUI object. Also, the GUI object can be clearable from the trading screen by click-selecting in a location where there is no tradeable object under the current location of the cursor or whether the user interacted with the screen.

In one or more implementations, a system and method are disclosed for causing a trade instruction to be constructed. A graphical user interface is provided that includes at least one interactive location of a trading screen. The interactive location corresponds to a tradeable object of interest to a user. A graphical user interface object is populated with data relating to a current market condition of the tradeable object, and the graphical user interface object is populated dynamically at least on the basis of a respective location in the trading screen. The graphical user interface object is presented in the graphical user interface, at the respective location in the trading screen such that the graphical user interface object presents at least a portion of the populated data centered around the respective location. A tactile input action associated with the graphical user interface object is received in the graphical user interface, and the trade instruction is caused to be constructed that is associated with the graphical user interface object and the received single-click action. Further, the trade instruction is transmitted to at least one computing device that is configured to execute the trade instruction.

The details of one or more implementations are set forth in the accompanying drawings and the description below. Other features and advantages will be apparent from the description and drawings, and from the claims.

BRIEF DESCRIPTION OF THE DRAWING FIGURES

Like reference symbols in the various drawings indicate like elements.

DETAILED DESCRIPTION

Figure 1:
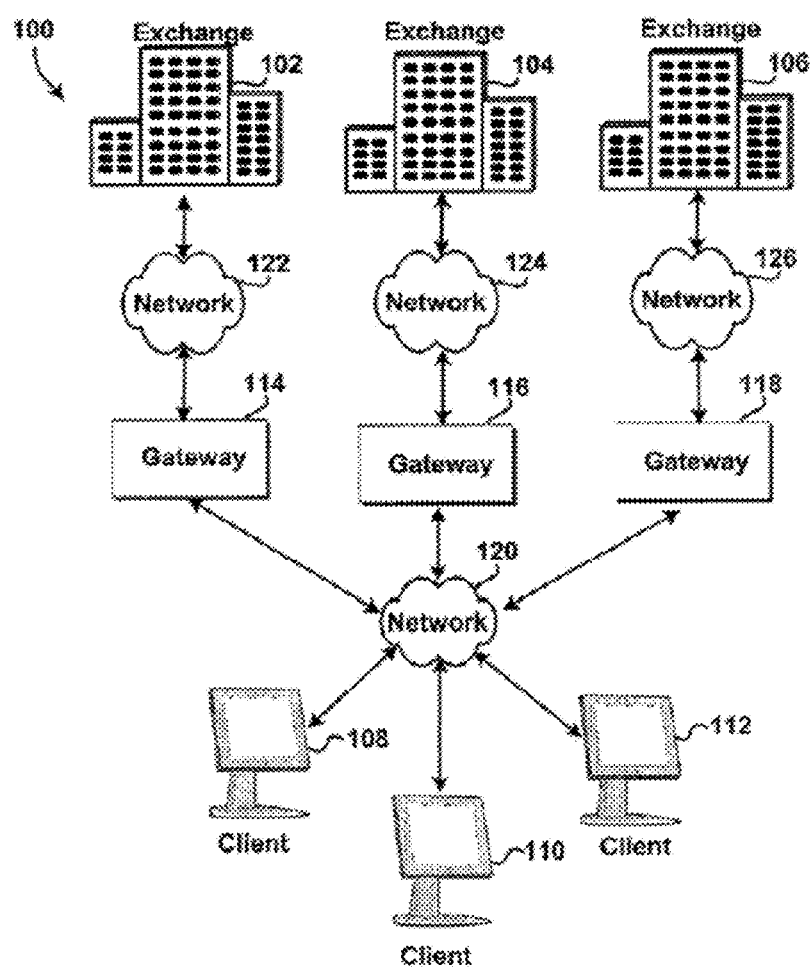
FIG. 1 illustrates an overview of an example system configuration, in accordance with an embodiment, used to relay market information to a variety of trading terminals.

By way of overview and introduction, methods, systems, and computer program products are described that can be put to advantageous use in an electronic trading environment. In particular, the embodiments described herein provide a feature that allows a user to select an area of interest on a trading screen, namely, an area where a price and Buy- or Sell-side is indicated. Trading systems use information, such as Buy- or Sell-side values, to effect trades. The present application may be made compatible with them. Upon an indication from the user that a desired area of interest is selected, for example, by a click of the mouse button, a graphical user interface ("GUI") object is positioned at the location of the area of interest and may be populated with market data, preferably current and real-time data, that can be selected in order to construct a trade instruction that is thereafter communicated for execution. As will be appreciated from the drawing figures and this description, the GUI object in one or more embodiments comprises a radially arranged menu of selectable actions that a trader can make. More particularly, the selectable actions are calibrated to the current market conditions of a tradeable object that is displayed on the screen at the location of the area of interest (e.g., the radial context menu presents price points selectable by the user that are centered at the current market for the tradeable object). The GUI object in this embodiment can be configured to present relevant options to a trader for very rapid and accurate construction of a trade instruction. The location of the area of interest informs the GUI object of how and what data elements may be populated, such as whether the trade instruction should have a bid- or an ask-setting. Likewise, the location of the area of interest may inform the GUI object of the price to be used.

Other systems, methods, features, and advantages of the embodiments will be or become apparent to one with skill in the art upon examination of the following drawings and description. It is intended that all such additional systems, methods, features, and advantages be within the scope of the present invention, and be protected by the accompanying claims.

Referring now to FIG. 1, an example of a trading system arrangement is presented. The system and method of the present invention are appropriate for use in any electronic trading environment. The example electronic trading system, comprising various elements, is described with the understanding that there are numerous equivalent elements and systems, all of which will be apparent to one of skill in the art. The block diagram of FIG. 1 illustrates an electronic trading system 100 which includes one or more electronic exchanges 102, 104, 106 and one or more client devices 108, 110, 112. In some instances, each of electronic exchanges 102, 104, 106 can use a different set of message specifications. Therefore, intermediate devices such as gateways 114, 116, 118, routers (not shown), and other such types of network devices can be used so that client devices 108, 110, 112 can recognize messages from and transmit messages to more than one electronic exchange, each of which can use a different message specification.

As indicated above, the embodiments are not limited to any particular trading system configuration. For instance, networks 122, 124, 126 could represent the same network, network 120 could represent the same network as networks 122, 124, 126, or client devices 108, 110, 112 could connect directly to gateways 114, 116, 118. It can be understood as well that the embodiments can be implemented with systems that have only one electronic exchange.

In one or more embodiments, electronic exchanges 102, 104, 106 represent electronic trading platforms that support electronic transactions of various kinds of tradeable objects. Examples of more sophisticated electronic trading platforms include the London International Financial Futures and Options Exchange (LIFFE), the Chicago Board of Trade (CBOT), the Chicago Mercantile Exchange (CME), the Exchange Electronic Trading ("Xetra," a German stock exchange), and the European Exchange ("Eurex"). In another embodiment, electronic exchanges 102, 104, 106 can also refer to other facilities, which include more basic systems that automatically match incoming orders. According to this embodiment, for instance, an electronic exchange 102, 104, 106 can simply refer to an online trading place where sports fans go to buy or sell seats for an event. Each of the electronic exchanges 102, 104, 106 can host one or more computer-based electronic markets. Traders can connect to the one or more electronic markets to trade tradeable objects. As used herein, the term "tradeable objects," refers simply to anything that can be traded with a quantity and/or price. It includes, but is not limited to, all types of tradeable objects such as events, goods and financial products, which can include, for example, stocks, options, bonds, futures, currency, and warrants, as well as funds, derivatives and collections of the foregoing, and all types of commodities, such as grains, energy, and metals. The tradeable object can be "real," such as products that are listed by an exchange for trading, or "synthetic," such as a combination of real products that is created by the user. A tradeable object could actually be a combination of other tradeable objects, such as a class of tradeable objects.

An electronic market can implement any of the numerous types of order execution algorithms; sometimes the type of algorithm depends on the tradeable object being traded. By way of illustration only, some example order execution algorithms include price/time priority (also referred to as first-in-first-out or "FIFO") and pro rata-style algorithms. The FIFO algorithm, for instance, attempts to give priority to the first person to place an order. The pro rata algorithm, for instance, splits all (or most) orders for the same price at a particular point in time. The system and method of the present invention are not limited to any particular type of order execution algorithm.

It is further understood that an electronic market can include other software and/or hardware components to perform other tasks beyond matching orders or part of orders. These software and/or hardware components can be local or remote to the physical location of an electronic exchange. In other words, the components can be operated at the electronic exchange or at locations outside of the electronic exchange such as points of access. Points of access can include gateways or other fast computing devices that are nearby the electronic exchange and have access to other points of access near other electronic exchanges.

In one or more embodiments, gateways 114, 116, 118 function as portals to a particular electronic exchange. Gateways 114, 116, 118 can include any computing device such as a mainframe, super minicomputer, minicomputer, workstation, or personal computer that connect network 120 to networks 122, 124, 126 so that market information can be successfully passed between client devices 108, 110, 112 and exchanges 102, 104, 106.

Gateways 114, 116, 118 may receive market data from exchanges 102, 104, 106 and convert it to a form compatible with the protocols used by client devices 108, 110, 112 using conversion techniques known in the art. Also, as known by those skilled in the art, gateways 114, 116, 118 can have one or more servers to support the data feeds, such as a price server for processing price information, an order server for processing order information, and a fill server for processing fill information. A trader at one of client devices 108, 110, 112 can subscribe to price information, order information, and fill information for a particular electronic market hosted at exchanges 102, 104, 106. According to another aspect, gateways 114, 116, 118 receive transaction information, such as orders, order changes, queries, etc. from client devices 108, 110, 112 and forward that information to corresponding exchanges 102, 104, 106. Also, client devices 108, 110, 112 can connect to electronic exchanges 102, 104, 106 without the need for protocol translation (not shown in FIG. 1). For instance, a client device can have computer software that recognizes a particular exchange's protocol, and therefore, can have a direct connection to the electronic exchange.

It should be understood that gateways or similar types of computer-based devices can be used as points of access. Accordingly, client devices 108, 110, 112 can access an electronic exchange through a gateway, especially if the gateway(s) is used as a point of access in a network and/or at an electronic exchange.

Client devices 108, 110, 112 can function as an interface to trade at one or more electronic exchanges 102, 104, 106. Examples of client devices include a workstation, personal computer, laptop computer, hand-held computer, or any other computing device, large or small, that includes at least a display, processor and memory. The processor and memory, which are both well-known computer components, are not shown in the figure for sake of clarity. A "display" includes any visual output device of a client device that can have its presentation updated by operation of code executing in the processor. For sake of illustration to the reader only, examples include a CRT-based display, LCD-based display, a gas plasma-based display, and so on. For instance, the display device can be physically set on a desk top for a user to view, projected on a wall by a projector, can be a part of a tablet computing device (e.g., an iPad of Apple Corporation) or a smart phone, or can be head mounted in special goggles.

It is further understood that a processor includes any device that, among other things, interprets and executes instructions. In other words, the processor functions as the "brains" of the client device. Processor can also encompass any components that make up the client device's main console to perform the functions described herein.

In one or more embodiments, depending on what tradeable objects are being traded, each of client devices 108, 110, 112 receive market information from one or more electronic markets hosted at any of electronic exchanges 102, 104, 106. Accordingly, market information is displayed to the trader(s) in a trading screen, in accordance with the embodiments, on a visual output device or display device. A trader can also receive news to aid in analyzing information received from the exchange.

Upon viewing the market information or a portion thereof, a trader can wish to send orders to an exchange, cancel orders in a market, change orders in a market, query an exchange, and so on. To do so, the trader can input various commands or signals into the client device 104 through the trading screen, for example, by using one or more conventional means for inputting information such as typing into a keyboard, inputting commands through a mouse, or inputting commands or signals through some other input device. In salient part, the GUI object such as the radial context menu object described herein can be used by a user to select commands and input them to the client.

Upon receiving one or more commands or signals, client devices 108, 110, 112 generate transaction information. In addition to or in place of manual entry, a trader can use automated trading software that automatically or semi-automatically generates transaction information. Of course, there are many different types of messages and/or order types that can be submitted to an electronic exchange, all of which can be considered various types of transaction information. Once generated, for instance, transaction information is sent from client device 108 to host exchange 102 over network(s) 120 and 122.

Referring now to FIGS. 2-9, a GUI object configured in accordance with the present application is described.

In one or more embodiments, a radial context menu is provided for click-to-trade that allows users to quickly indicate an action to take, which may include the price, size, and whether to Buy or Sell. Rather than specifying each attribute of an order individually, the user can simply select a price level and choose a size and whether to buy or sell all by moving the mouse to a node in the menu. In one or more implementations, the user clicks, holds, drags and then releases the button to specify and instruct a trade to occur.

Figure 2:
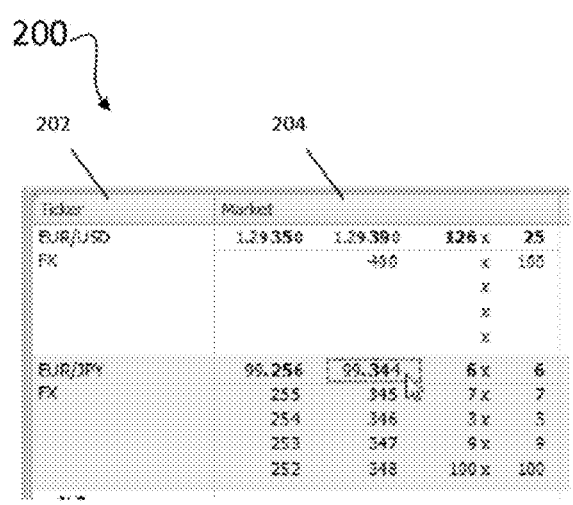
FIG. 2 is an exemplary screen shot showing a price that would be traded upon clicking a mouse or otherwise interacting with the display.

FIG. 2 illustrates an example display 200 that provides selectable information in connection with placing a trade. Ticker column 202 and market column 204 include selectable options to identify symbols associated with tradeable securities, as well as options associated with Buy, Sell, and Size. In connection with the example display 200 shown in FIG. 2, to submit an order, the user moves his or her selection device, such as a mouse, to a respective price the user would like to trade. The GUI in display 200 provides visual feedback to indicate the price that the corresponding security would be traded when clicking the mouse. Additionally, the user can click on a respective size value that corresponds to the price in the market display. As noted herein, the GUI may be configured to use different defaults or settings than may otherwise be used when clicking on the price.

In one or more implementations, a petal-shaped graphical screen control is provided that changes in appearance and functionality, dynamically and in response to user actions taken, for example, via a keyboard or selection device (e.g., mouse, trackball, touchscreen, tablet or other suitable pointing device). As the user's cursor moves from the center of the graphical screen control outwardly, new graphical regions may appear visible substantially automatically that provide functionality beyond that provided in the initial petal-shaped graphic. Thus, one or more petals may appear dynamically in response to user-based activity (e.g., pointer movement), as opposed to a fixed number of discrete petals. Thus, different contexts and different functionality may be provided as the user moves from the center of the petal-shaped graphic. For example, different values, different ranges of values, or scales may be provided pursuant to the distance the user's selection device is from the center of the petal-shaped graphical object.

Figure 3:
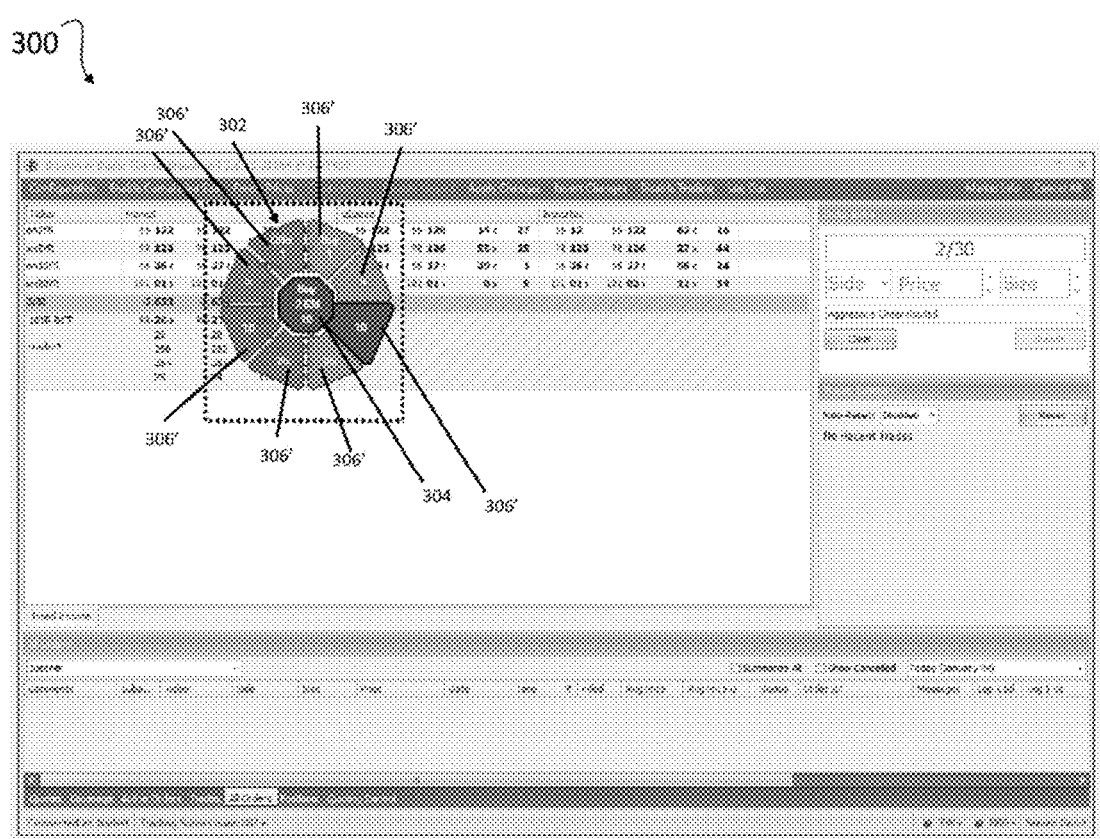
FIG. 3 is an exemplary screen shot showing a GUI object having petal-shaped nodes and further showing a highlighted petal as a result of movement of the mouse or otherwise interacting with the display after clicking, but not releasing, the mouse, etc.

FIG. 3 illustrates an example screen display 300 that includes the radial context menu 302 formatted as petal-shaped graphical object, and usable for defining and executing a trade instruction. Upon a user's initiating a selection, such as an initial click of the user's mouse button, the radial context menu may be displayed, substantially as illustrated in FIG. 3. In the example shown, radial context menu 302 includes a center node 304 surrounded by a variable number of petal nodes 306'. Each petal node 306' may represent a different action the user can take. The center node 304 may display the action that will be taken in response to the user releasing the mouse button. In one or more implementations, a default action is specified when the mouse is placed over the center node 304. The example display screen 300 shown in FIG. 3 shows the menu in this state, where the user has clicked, but has not moved the mouse. In the example shown, a default action (Buy 10 @–2.634) is selected, and the petal node for that default action is highlighted.

Each petal node 306' may specify a varying level of detail for the action to be taken, allowing redundant information to be skipped and increasing efficiency to reduce valuable time associated with rapid trading activity. For example and as shown in the example display screen 300, the top two nodes 306' show the action being taken for the nodes on that side of the menu, in this case "Offer" and "Buy", while the remaining nodes 306' omit this redundant detail. Although illustrated in the drawings in grayscale, each node 306' may also specify a color, thereby providing additional visual feedback associated with and available action a user may take. For example, nodes 306' that are selectable for instructing a Sell command are colored red and nodes 306' that are selectable for instructing a Buy command are colored green. Furthermore, the center node 304 may also display the price of the respective node 306' that the user selected (e.g., clicked on). In one or more implementations, information displayed in the menu (e.g., petal-shaped graphical object 302) is contextual. For example, if buying at the selected price would cross the market, the menu indicates "Buy" or "Sell" which represents an aggressive order. Alternatively, the menu may other terms, such as "Bid" or "Offer," which represent a more passive order. Information displayed in the menu may be color-coded to represent varying degrees of aggressiveness, as well.

As noted herein, one side of the radial context menu 302 (e.g., petal-shaped object) represents one type of action and the other side of the object represents another. For example, all petal nodes 306' appearing on the left side of the object provide values associated with a Sell, while all the nodes 306' on the right side of the object provide values associated with a Buy. In an alternative, all petal nodes 306' on the left side of the object may provide values associated with size, while all petal nodes 306' on the right side of the object may represent price. Other variations are provided herein including, for example, providing contextual options in various quadrants of the radial context menu 306'. For example, the left top quarter may represent Sell Size options, the left bottom quarter may represents Buy Size options, the right top quarter may represent Sell Price options, and the right bottom may represents Buy Price options. The values may be provided in various suitable ways, such as shown and described herein.

In one or more implementations, various graphical representations of radial context menu 302, other than a petal-shaped graphic, may be provided. For example, a linear scale may be provided with reference to values associated with a range. The range may depend on the distance that the user's selection device is from the center of the petal-shaped graphical object. Alternatively, a roulette wheel-shaped graphic is provided with a range of values. As the user moves his or her selection device within the wheel, values may be displayed that correspond with the position of the selection device in the wheel. The wheel may be partitioned or otherwise segmented to represent different orders (e.g., Buy/Sell/bid/offer). Various embodiments illustrating different graphical representations are shown and described in greater detail below.

Actions for the radial context menu 306' can be configured. In one or more implementations, actions are added for buying and selling at various sizes. One of the sizes is the "normal" order size, which is the default for placing orders. The other three sizes are preset sizes that the user can override. For usability, these sizes are sorted when displayed in the menu. The configuration is context-sensitive, so they can be configured differently for different securities.

Another feature of user-customization provided in accordance with the present application includes automatically setting one or more values associated with a trade based on the respective security, stock or other thing of value being bought or sold. Values may be set, for example, in accordance with a user profile or other accessible data source. For example, a user may identify (simply by clicking or by other selection activity) the name of a security and data entry options for all information associated with the trade (e.g., type, size and price) are automatically populated. Thereafter, the user simply indicates a confirmation (e.g., by releasing the mouse button, or by clicking again) and the trade is effected. This feature significantly reduces the amount of time to issue a trade instruction that would otherwise be required of the user.

In one or more embodiments, a level of user customization is provided as a function of profile information that may be used for future reference. Various kinds of information associated with a particular user may be stored locally in a particular computing device operated by a user, or may be obtained remotely, such as over a communication network. Kinds of information may include a user's current position (i.e. the amount of shares a user has), default values that a user would like to appear automatically (e.g., in connection with side, size and price), and particular functionality a user wants provided, such as in connection with selection device movements, display-screen locking, feedback information, etc. Further, functionality may be provided in connection with information associated with a particular user. For example, a user may be long in one particular stock (e.g. IBM), which may result in the system defaulting to a Sell position and the user may be short in another (e.g. Microsoft) which may result in the system defaulting to a Buy position. The user is then relieved from having to determine a current position and from making a side-related selection, which saves valuable seconds in the course of making a transaction. Other default functionality, such as a default price, may be selected in view of a user's position or other relevant information. Moreover, graphical objects, such as dynamically appearing, disappearing or changing petal shapes, may be provided in context as a function of default information and/or selections made by a user in connection with a trade.

Figure 4A:
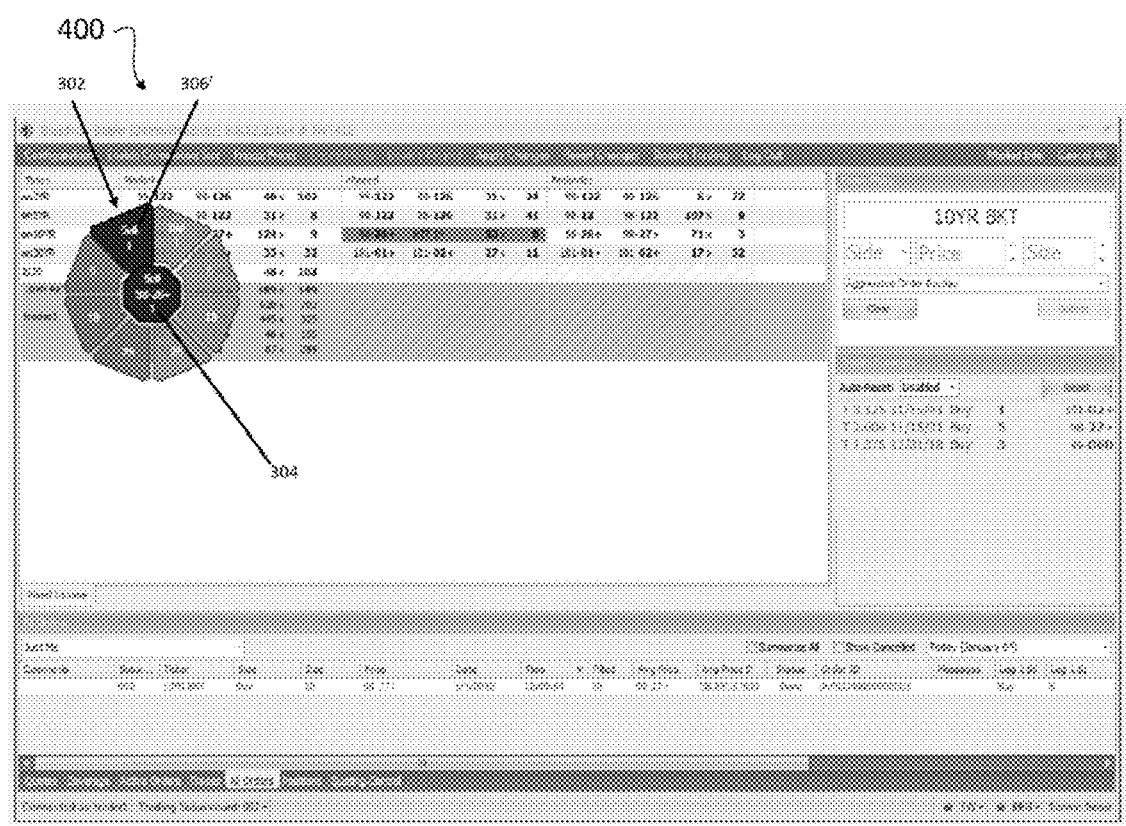
FIGS. 4A and 4B are an exemplary screen shots showing a sequence of selections in accordance with an embodiment of the application.
Figure 4B:
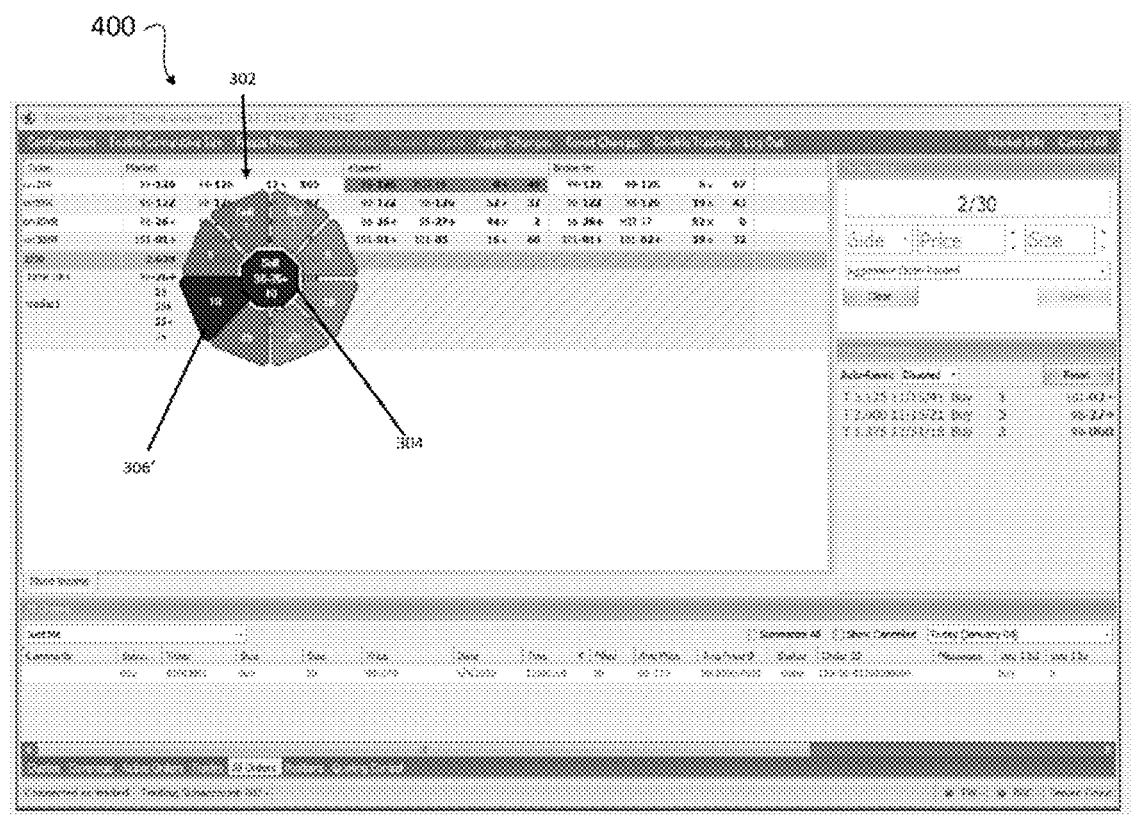

In one or more implementations, when a user moves the mouse over a petal node 306', that node becomes the currently selected action. The currently selected node 306' may be displayed in an easily distinguishable way from the other nodes 306'. For example, the size, color and transparency of the petal selected node 306' may be used to set it apart from the other nodes 306'. FIG. 4A illustrates an example display screen 400 that shows a radial context menu 302 having a selected node 306' that is displayed apart from the other nodes 306' included in the menu 302. As shown in example display screen 400, the center node 304 displays a color and text that matches the display (and corresponding action) associated with the selected node 306'. When, for example, the user releases the mouse button, an instruction associated with the selected action is executed. FIG. 4B shows the example display screen 400 provided after the user moved the mouse (without releasing) to a different node 306'. Thus, as can be seen in the combined views of FIGS. 4A and 4B, the user moves from a Sell size of 1 to a Sell size of 10 simply by moving his/her selection device to a different petal node 306', with the price remaining the same (as indicated in center node 304).

In one or more implementations, when the user moves the mouse back to the center node, the default action is re-selected.

In one or more implementations, the present application supports click-to-trade functionality and can be configured to operate in various modes, including disabled, prime-only, double-click and single-click. In the prime-only mode, for example, an order entry form is populated substantially automatically with the price, size, and side the user chose from the radial context menu 302, with a restriction that the user cannot submit the order via click-to-trade. In single-click mode, options for an order are made via radial context menu 302, and an instruction for a transaction may be submitted immediately upon the user releasing the mouse button. In double-click mode, the user must perform two clicks in order to submit an order. The first click brings up the radial context menu, allowing the user to specify the side and size of the order. For usability and to make the order entry process as fast as possible, after the first click is released, the mouse cursor may be returned to the location of the initial click. The price or size the user clicked on in the market grid is shown highlighted, and the order entry form is populated with the details of the order. Clicking the highlighted region again will submit the order. If the user clicks anywhere outside of the highlighted region, if a timeout elapses, or if the user explicitly cancels the order, the order will be canceled.

Figures 5A, 5B:
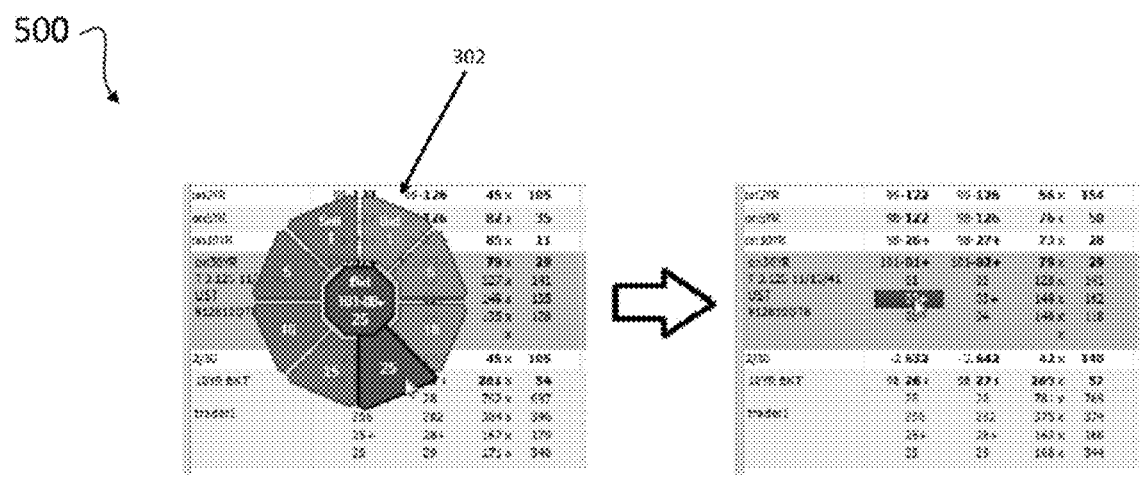
FIGS. 5A and 5B are an exemplary screen shots showing a double-click sequence in accordance with one embodiment of the application.

FIGS. 5A and 5B illustrate an example implementation that demonstrates a sequence, in accordance with double-click mode, described above.

Figure 6:
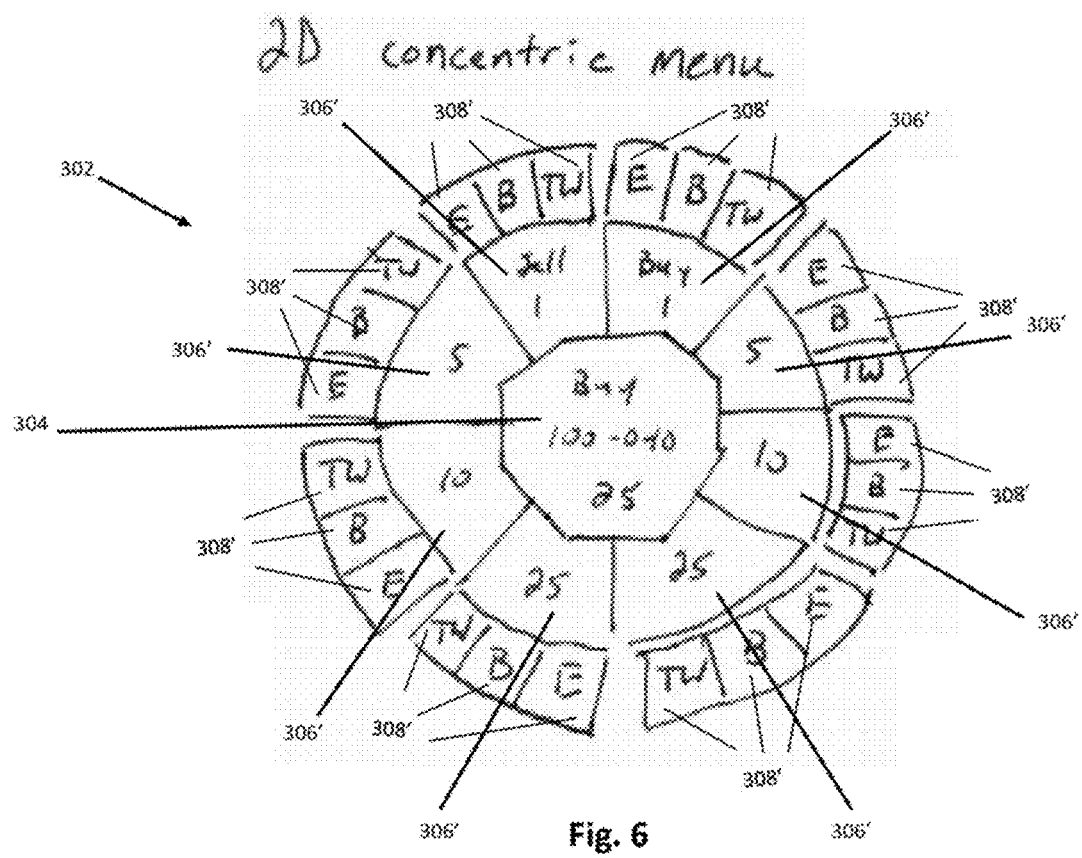
FIG. 6 is an exemplary screen shot showing a GUI object in accordance with an alternative embodiment and further showing concentric options of selectable nodes.

Although the example radial context menu 302 shown in FIGS. 3-5A illustrates a single ring of petals, the application is not so limited. In addition to a first collection (such as a ring) of petals, one or more concentric collections of petals may be provided for efficient and fast entry of values, such as associated with a trade. FIG. 6 illustrates an alternative embodiment of the radial context menu 302 that includes an inner ring of petal nodes 306' that includes selectable values associated with price, while an outer ring of petal nodes 308' that includes selectable values associated with one or more trading platforms, each of which may provide varying price ranges as a function of the size, and the respective platform itself. By providing multiple and concentric objects associated with values, the present application improves data entry speed and efficiency. The outer ring of petal nodes 308' may be statically presented, in which radial context menu 302 displays both rings of petal nodes 306', 308' simultaneously. Alternatively, just one ring, e.g., outer ring of petal nodes 308', may be dynamically presented, in which radial context menu 302 includes one ring of petal nodes 306', and upon an indication of a selection of one of the nodes 306', such as by a user hovering over one of the nodes 306', the second ring of petal nodes 308' appears and the user moves his/her mouse to select one.

Thus, as shown in FIG. 6 and described above, the present application supports concentric collections of nodes in a GUI, such as associated with radial context menu 302.

Figure 7A:
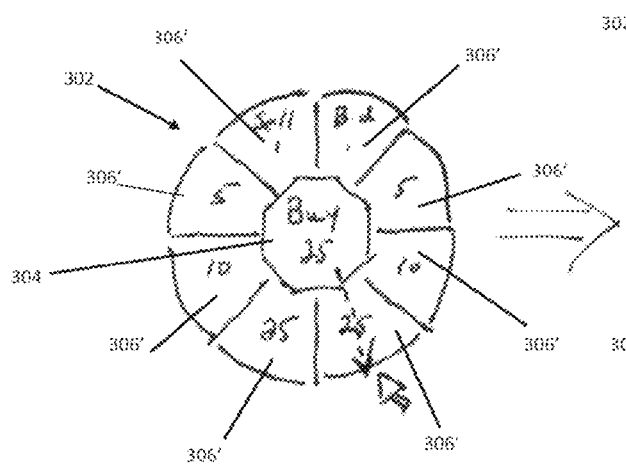
FIGS. 7A and 7B illustrate an example GUI object in accordance with an alternative embodiment and further showing multi-level options of selectable nodes.
Figure 7B:
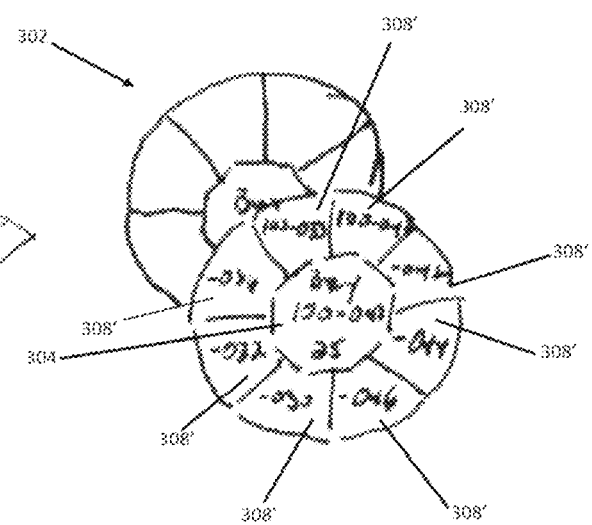

FIGS. 7A and 7B illustrate an implementation of radial context menu 302 that is an alternative to the menu 302 that is illustrated in FIG. 6. In the examples shown in FIGS. 7A and 7B, two collections of petal nodes are displayed (nodes 306' and 308'). Unlike the implementation shown in FIG. 6, however, the second collection of nodes 308' appears to hover above and at least partially adjacent to the collection of nodes 306' for selection. In the example shown in FIGS. 7A and 7B, nodes 306' includes selectable values associated with size. The user has made an initial mouse selection by clicking in the center node 304 and proceeded to drag the mouse down while holding down the mouse button over the value 25 associated with a Buy action. As the user drags the mouse down past the petal node 306', a second collection of petal nodes 308' appears for selecting price. Once the user selects a respective petal node 308', the center node 304 displays the value selected there-from (shown as 100-44) along with the previously selected size-related value (25). The example shown in FIG. 7B illustrates a fixed income convention, where the "-" denotes the handle. For example, a price like "100-042" represents 100 plus 4/32 plus 2/256. When the handle (the "100") is the same, it is omitted, so "-042" represents the same as "100-042" or 100.2578125. Moreover, the numbers counter-clockwise from 12 o'clock to 6 o'clock are smaller, and the numbers clockwise from 12 o'clock to 6 o'clock are larger.

Various other customization options are provided by the present application. For example, and without limiting the present disclosure, a user may initiate a selection (e.g., down click without release using a mouse) on a petal of radial context menu 302. While holding down the mouse, the user drags outwardly and away from the initially selected petal to reveal and, thereafter, select a respective value, such as relating to size or price. As the user is dragging outwardly, incremental and selectable values appear. The increments may be fixed, such as by multiples of 10 (e.g., 1, 2, 3, 4, 5), or the increments may be variants relative to the distance from the initial selection (e.g., 1, 2, 5, 10, 25, 50). In another variation, the user's cursor may move to a default value, which may be set in a profile or other data source. The default value may be set for size and/or price, and further may be vary depending upon one or more conditions, such as the user's current or foreseen position. Other options are supported, including a type of "snap-to" functionality, wherein the user's cursor moves to respective values and requires little movement by the user's selection device (e.g., mouse) to navigate from one value to another. By providing snap-to functionality, the amount of time otherwise required to select values (e.g., size, price or the like) is greatly reduced.

Figure 8:
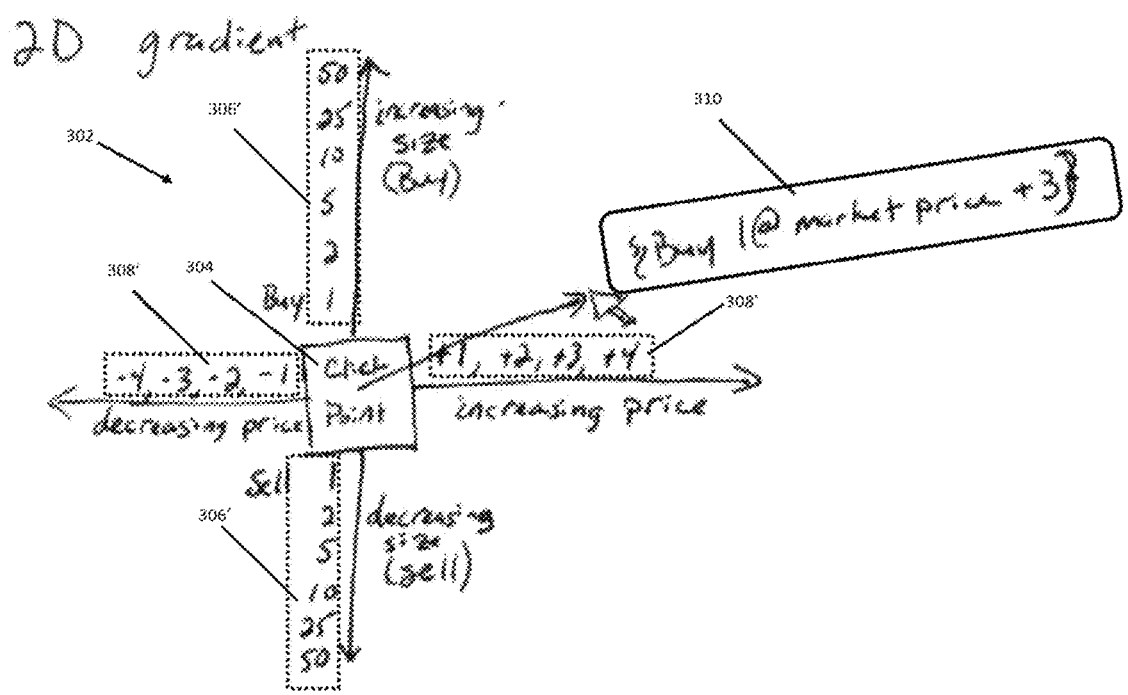
FIG. 8 illustrates a GUI object in accordance with yet another alternative embodiment and further showing X- and Y-axes of selectable nodes.

FIG. 8 illustrates an alternative example radial context menu 302 in which values associated with nodes 306' and 308' are presented on X- and Y-axes on a graph. In the example shown in FIG. 8, nodes 306' are associated with size, and nodes 308' are associated with price, with each further bisected as a function of Buy- and Sell-side commands. Moreover, display section 310 is illustrated in FIG. 8 that identifies the selections made to that point. Display section 310 may be incorporated in center node 304, as shown and described above in connection with FIGS. 3-7, or may hover above the axes as shown in FIG. 8.

In the example illustrated in FIG. 8, the user has made an initial mouse selection by clicking in the center of the intersecting lines and, while holding down the mouse button, proceeded to drag the mouse up to a Buy value of 1 and to the right to a market price value above 3 associated with a Buy action.

The present application provides tremendous time savings in connection with performing complex transactions (such as trades) and for sending instructions in connection with one or more such transactions. As shown and described herein, the present application operates beyond simple drag-and-drop functionality, for example by tracking a relative position where a selection is initiated (i.e. a click is started but not released) and a subsequent relative position where the selection is completed (i.e. the click is released). At the point of release, a transaction instruction may be determined, assembled and sent to one or more devices configured to carry out the transaction. For example, a user clicks his mouse in a center of a petal-shaped graphical screen object, but does not release the mouse until the user has slid to a respective petal located at a particular place that represents the side, size and price of the offer. In another example, a user moves a mouse in a particular position (e.g., up or down), which results in value options that correspond with the direction/position of the mouse. Moving the cursor in an upward position, for example, may result in price options that are above market price. Moving the cursor in a downward position may result in price options that are below market price. In case, for example, the user releases the selection click at least a minimum distance away from a respective position, such as the perimeter of the radial context menu 302, a cancel instruction may be determined.

Moreover, following an initial selection click and prior to the release, options and graphical controls may dynamically appear, disappear and/or change in accordance with the location of the cursor, values that are displayed, user preference information or other contextual feature. Thus, new choices and new options made dynamically appear substantially in real time as users define trade instructions.

Accordingly, the radial context menu 302 may be extended in various ways that could be configurably enabled. For example, sounds may play when a menu is opened, when the mouse moves to new nodes, or when the mouse moves to change the action. Moreover, various visual representations may be provided and in different formats, such as a vertical or horizontal ladder of prices and sizes to the left and right (or top and bottom) of the center node, instead of radial nodes. Alternatively, there might be no center node displayed and the user selects the specific action, price and size only from a petal node. Other visual representations are also possible (i.e. a circle, square, or other shapes and arrangements of petal nodes). Further, several layers, or rings, of petal nodes could be supported allowing the user to select more actions, prices, and sizes by selecting petal nodes further away from the center node.

Additionally, various kinds of order parameters may be selectable within the nodes (such as account, order type, or any other parameter controllable on an order). For example, as a user moves the mouse further from the center node, the size or price could increase or decrease, allowing distance to be a factor in controlling one of the parameters (in addition to selecting a node). Different clicking styles are also supported, such as clicking and releasing to open the radial menu, then clicking on a node instead of releasing the mouse on a node to select that node. Moreover, the display of market data that the user initiates the first click on may be any different kind of market data display including, for example, a grid display of prices and sizes as shown, a ladder display, or any other visual representation of orders in the marketplace that a user can mouse over and click on.

In addition to graphical representations for effecting behavior, hardware apparatus controls may be used for controlling the interface in accordance with the present application. For example, a mouse selector wheel may be pressed or scrolled that causes a price or size to change Scrolling in one direction may result in a change to a size of an order, while scrolling in the opposite direction may result in a change to a price. It is recognized by the inventors that safeguards may be included to prevent a user from inadvertently placing an order by simply rolling a mouse wheel too quickly, such as the double-click sequence described above with reference to FIGS. 5A and 5B.

In one or more implementations, parameter values associated with a trade, such as relating to size and price, may be customized for a particular user. For example, a graphical screen control, such as a textbox, checkbox, radio button, dropdown list, slider control or other suitable control, is provided for receiving information from a user. For example, as a user hovers his or her mouse cursor over a graphical object, such as a graphical petal-shaped image, a slider control appears that includes a range of values from 1-100. The range of values may be determined as a function of a user profile or other information source that is particular to a user. Upon selection of a value in the control, then values associated with portions of the base object (e.g., associated with various petals of the petal-shaped graphical object), may be multiples of the selected value. For example, if the user selects a value, 30, from the slider control, then the petals may include the values: 0, 30, 60, 90, 120, 150, etc. Thus, the present application supports training and customization of GUI.

Figure 8A:
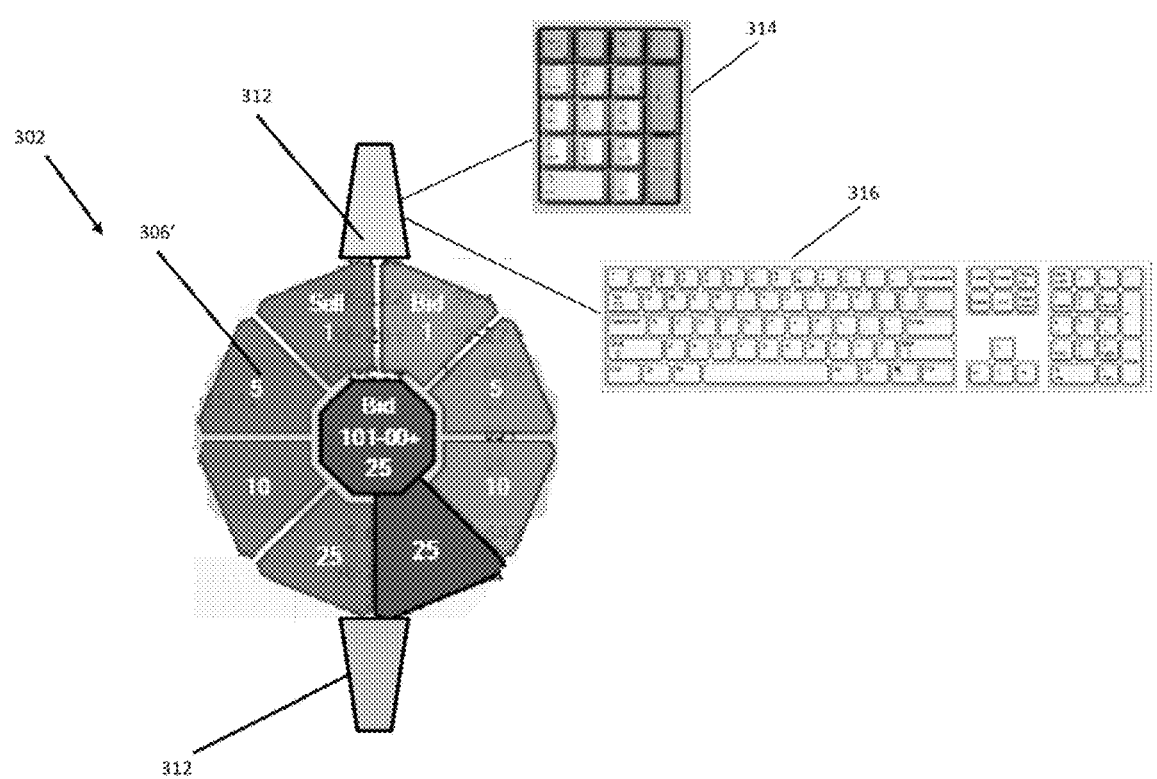
FIG. 8A illustrates an example GUI object associated in accordance with an alternative embodiment and providing alternative data entry controls.

FIG. 8A illustrates an example GUI object associated with radial context menu 302 in accordance with an alternative embodiment. In the example shown in FIG. 8A, two additional petal-shaped nodes 312 are illustrated that, when selected, provide additional functionality and that may be customized and/or configured for particular users. Although two such nodes 312 are illustrated in FIG. 8A, any one or more nodes 312 may be included with menu 302. Upon selection of node 312, one or more contexts may be supported including, for example, additional menu selections that may appear and that correspond to a particular user's preferences. For example, upon selection of node 312, data entry may be performed for editing user-preferences, such as relating to default values, ranges of values, appearance/functional options of radial context menu 302, sources of portfolio information, and to lock the user's screen. Other options may relate to how radial context menu 302 behaves in connection with mouse control movements, such as how long a user hovers at a location before a selection is made, how far a user's mouse cursor must move before a cancellation instruction is received, whether single or double click actions are used, or the like. Yet other examples of options may relate to data, such as whether to round up or down, setting a relative degree of aggressiveness (e.g., whether a user is particularly bullish), contexts when a user prefers aggressive versus conservative bids, or the like. Therefore, the present application supports many suitable user interactions in addition to clicking and dragging behavior. In one or more implementations, an action taken by a user and responded to by the module is a substantially continuous movement action with a defined start and a defined end, with monitoring/tracking of the movement in-between. Such user-based interactions are monitored between a defined beginning point (e.g., a click) and an ending point (e.g., un-click, second click or the like). A tactile input action received from a user, such as a single-click/drag/release, double-click, movement, hesitation and/or multiple clicks are supported for representing a defined beginning point, defined ending point and/or any point(s) or portion(s) therebetween. In one or more implementations, the software is configured to monitor, recognize and/or validate user actions representing particular instructions in accordance with the present application. Moreover, and as noted herein, any suitable selection device and/or method is supported, including by use of a mouse, trackball, touchscreen, touchpad, or other suitable touch interface.

In yet another example, selection of node 312 may result in display of one or more additional graphical controls for entering data by a user. For example, when selected, node 312 causes a graphical object representing numeric keypad 314 to appear. A user may select numbers in keypad 314 to enter precise values, or values that may not be otherwise provided automatically by radial context menu 302. Moreover, selection of node 312 may result in display of a "full" alpha-numeric keyboard 316 that enables the user to submit additional information, thereby increasing the level of customization and functionality associated with radial context menu 302. In addition to a virtual or graphical keyboard/keypad, a user may enter values using a physical keyboard/keypad, as well.

Accordingly, and as illustrated in FIG. 8A, radial context menu 302 may include one or more petal nodes that appear distinct from other nodes and that invoke one or more customizable options for the user to enhance the functionality provided by radial context menu 302.

Figure 9:
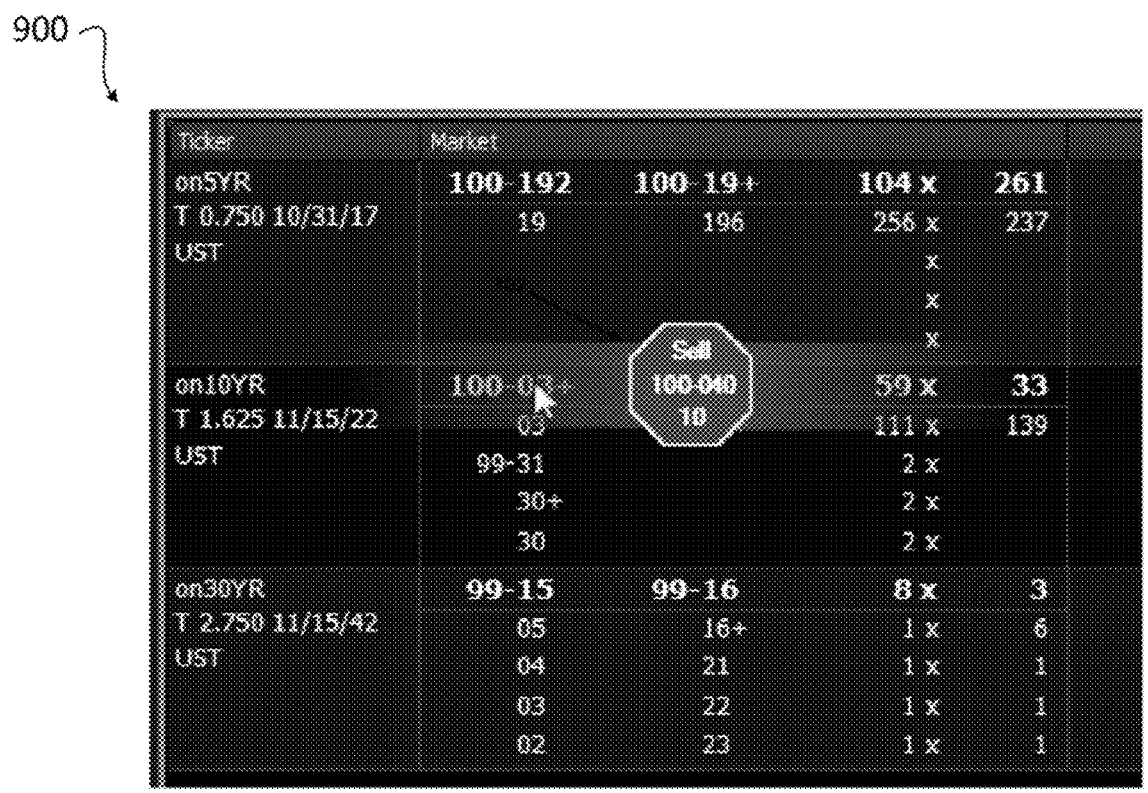
FIG. 9 illustrates an example GUI object in accordance with an embodiment of the present application in which the instruction is displayed.

FIG. 9 illustrates an example GUI object in accordance with an embodiment of the present application in which the instruction is displayed. The example shown in FIG. 9 illustrates an alternative to a set of leaf nodes (e.g., a fixed set of nodes), that may be provided as gradient selectable options. Moreover, and as shown in FIG. 9, the farther a user pulls away from the location of an initial click, the larger/smaller the value is provided for selection. Thus, and as shown in FIG. 9, alternative implementations are provided in accordance with the present application.

It should be understood that in some implementations an 'engine' as referred to herein can include one or more processors configured by code to implement the functionality of the engine that is being described.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

Figure 10:
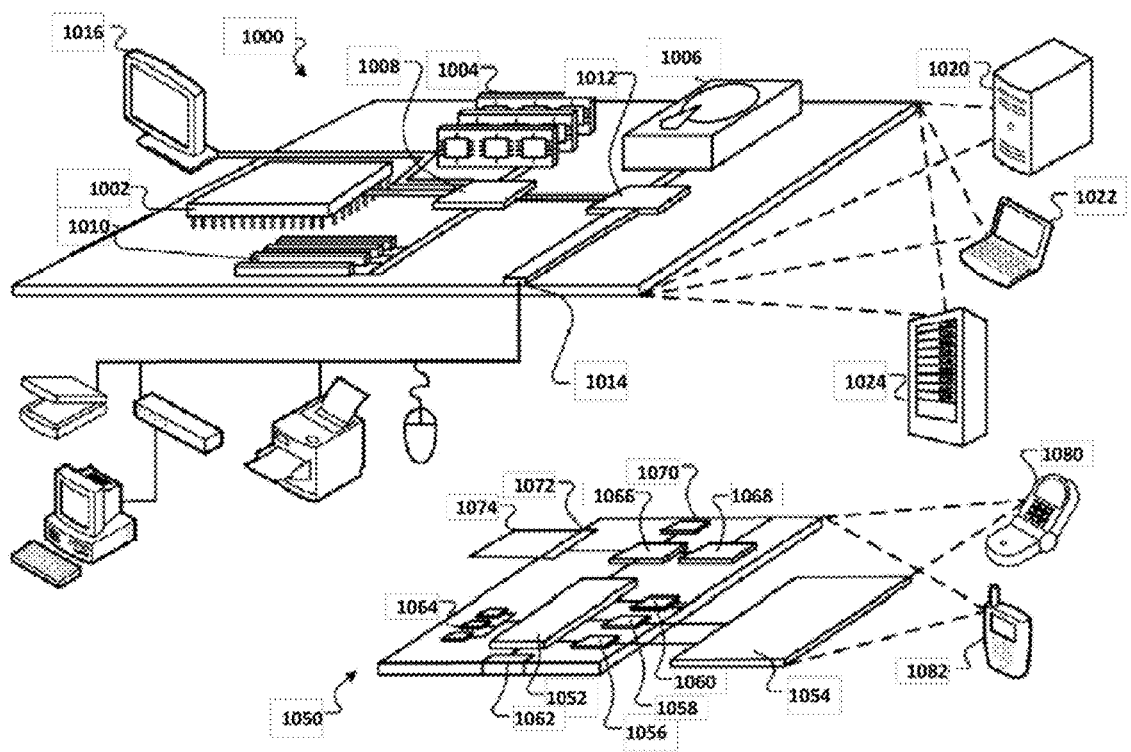
FIG. 10 shows an example of a computing device and a mobile computing device that can be used in connection with computer-implemented methods and systems described in the present specification.

FIG. 10 shows an example of a computing device 1000 and a mobile computing device that can be used to implement the techniques described herein the present specification. The computing device 1000 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, tablet computing devices, cellular telephones, smart-phones, and other similar computing devices. The components shown here, their connections and relationships, and their functions, are meant to be exemplary only, and are not meant to limit implementations of the inventions described and/or claimed in this document.

The computing device 1000 includes a processor 1002, a memory 1004, a storage device 1006, a high-speed interface 1008 connecting to the memory 1004 and multiple high-speed expansion ports 1010, and a low-speed interface 1012 connecting to a low-speed expansion port 1014 and the storage device 1006. Each of the processor 1002, the memory 1004, the storage device 1006, the high-speed interface 1008, the high-speed expansion ports 1010, and the low-speed interface 1012, are interconnected using various busses, and can be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as a display 1016 coupled to the high-speed interface 1008. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1004 stores information within the computing device 1000. In some implementations, the memory 1004 is a volatile memory unit or units. In some implementations, the memory 1004 is a non-volatile memory unit or units. The memory 1004 can also be another form of computer-readable medium, such as a magnetic or optical disk.

The storage device 1006 is capable of providing mass storage for the computing device 1000. In some implementations, the storage device 1006 can be or contain a computer-readable medium, e.g., a computer-readable storage medium such as a floppy disk device, a hard disk device, an optical disk device, or a tape device, a flash memory or other similar solid state memory device, or an array of devices, including devices in a storage area network or other configurations. A computer program product can also be tangibly embodied in an information carrier. The computer program product can also contain instructions that, when executed, perform one or more methods, such as those described above. The computer program product can also be tangibly embodied in a computer- or machine-readable medium, such as the memory 1004, the storage device 1006, or memory on the processor 1002.

The high-speed interface 1008 manages bandwidth-intensive operations for the computing device 1000, while the low-speed interface 1012 manages lower bandwidth-intensive operations. Such allocation of functions is exemplary only. In some implementations, the high-speed interface 1008 is coupled to the memory 1004, the display 1016 (e.g., through a graphics processor or accelerator), and to the high-speed expansion ports 1010, which can accept various expansion cards (not shown). In the implementation, the low-speed interface 1012 is coupled to the storage device 1006 and the low-speed expansion port 1014. The low-speed expansion port 1014, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1000 can be implemented in a number of different forms, as shown in the figure. For example, it can be implemented as a standard server 1020, or multiple times in a group of such servers. In addition, it can be implemented in a personal computer such as a laptop computer 1022. It can also be implemented as part of a rack server system 1024. Alternatively, components from the computing device 1000 can be combined with other components in a mobile device (not shown), such as a mobile computing device 1050. Each of such devices can contain one or more of the computing device 1000 and the mobile computing device 1050, and an entire system can be made up of multiple computing devices communicating with each other.

The mobile computing device 1050 includes a processor 1052, a memory 1064, an input/output device such as a display 1054, a communication interface 1066, and a transceiver 1068, among other components. The mobile computing device 1050 can also be provided with a storage device, such as a micro-drive or other device, to provide additional storage. Each of the processor 1052, the memory 1064, the display 1054, the communication interface 1066, and the transceiver 1068, are interconnected using various buses, and several of the components can be mounted on a common motherboard or in other manners as appropriate.

The processor 1052 can execute instructions within the mobile computing device 1050, including instructions stored in the memory 1064. The processor 1052 can be implemented as a chipset of chips that include separate and multiple analog and digital processors. The processor 1052 can provide, for example, for coordination of the other components of the mobile computing device 1050, such as control of user interfaces, applications run by the mobile computing device 1050, and wireless communication by the mobile computing device 1050.

The processor 1052 can communicate with a user through a control interface 1058 and a display interface 1056 coupled to the display 1054. The display 1054 can be, for example, a TFT (Thin-Film-Transistor Liquid Crystal Display) display or an OLED (Organic Light Emitting Diode) display, or other appropriate display technology. The display interface 1056 can comprise appropriate circuitry for driving the display 1054 to present graphical and other information to a user. The control interface 1058 can receive commands from a user and convert them for submission to the processor 1052. In addition, an external interface 1062 can provide communication with the processor 1052, so as to enable near area communication of the mobile computing device 1050 with other devices. The external interface 1062 can provide, for example, for wired communication in some implementations, or for wireless communication in other implementations, and multiple interfaces can also be used.

The memory 1064 stores information within the mobile computing device 1050. The memory 1064 can be implemented as one or more of a computer-readable medium or media, a volatile memory unit or units, or a non-volatile memory unit or units. An expansion memory 1074 can also be provided and connected to the mobile computing device 1050 through an expansion interface 1072, which can include, for example, a SIMM (Single In Line Memory Module) card interface. The expansion memory 1074 can provide extra storage space for the mobile computing device 1050, or can also store applications or other information for the mobile computing device 1050. Specifically, the expansion memory 1074 can include instructions to carry out or supplement the processes described above, and can include secure information also. Thus, for example, the expansion memory 1074 can be provide as a security module for the mobile computing device 1050, and can be programmed with instructions that permit secure use of the mobile computing device 1050. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1064, the expansion memory 1074, or memory on the processor 1052. In some implementations, the computer program product can be received in a propagated signal, for example, over the transceiver 1068 or the external interface 1062.

The mobile computing device 1050 can communicate wirelessly through the communication interface 1066, which can include digital signal processing circuitry where necessary. The communication interface 1066 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1068 using a radio-frequency. In addition, short-range communication can occur, such as using a Bluetooth, WiFi, or other such transceiver (not shown). In addition, a GPS (Global Positioning System) receiver module 1070 can provide additional navigation- and location-related wireless data to the mobile computing device 1050, which can be used as appropriate by applications running on the mobile computing device 1050.

The mobile computing device 1050 can also communicate audibly using an audio codec 1060, which can receive spoken information from a user and convert it to usable digital information. The audio codec 1060 can likewise generate audible sound for a user, such as through a speaker, e.g., in a handset of the mobile computing device 1050. Such sound can include sound from voice telephone calls, can include recorded sound (e.g., voice messages, music files, etc.) and can also include sound generated by applications operating on the mobile computing device 1050.

The mobile computing device 1050 can be implemented in a number of different forms, as shown in the figure. For example, it can be implemented as a cellular telephone 1080. It can also be implemented as part of a smart-phone 1082, personal digital assistant, tablet computing device, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input action.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any implementation or of what can be claimed, but rather as descriptions of features that can be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing can be advantageous.

What is claimed:

1. A method for generating a trade instruction in an electronic exchange using a trading screen provided on a computing device that includes a processor and non-transitory processor readable media including code, the method comprising:
   providing, via the trading screen that operates on the computing device, a plurality of interactive locations, each comprising less than the entire trading screen and each being configured to receive input from the computing device, wherein one of the interactive locations corresponds to a tradeable object of interest to a user;
   displaying, at the one interactive location, a current market condition of the tradeable object at a respective time, as a function of one or more data feeds received by the computing device from at least one other computing device over a communication network;
   in response to received input at the one interactive location, causing a graphical user interface object to dynamically appear in the trading screen at the one interactive location;
   populating, by the processor executing code on the basis of the one interactive location, the graphical user interface object with data relating to the market condition of the tradeable object at the respective time;
   calibrating, by the processor executing code, the graphical user interface object with selectable options as a function the user's position in the tradeable object;
   in response to a received user selection of an option in the calibrated graphical user interface object, generating, by the processor executing code, the trade instruction that is associated with the tradeable object; and
   transmitting, by the processor executing code, the trade instruction to at least one other computing device that is configured to execute the trade instruction.

2. The method of claim 1, wherein the trade instruction includes a price, and a Buy-side or a Sell-side that is selected in view of the interactive location the trading screen.

3. The method of claim 1, wherein the received user selection of the option is made by a tactile input action having a measurable size and, further wherein,
   the trade instruction is further generated in view of the measurable size.

4. The method of claim 1, further comprising receiving by the processor executing code in the trading screen, an interaction with the graphical user interface object; and further comprising:
   generating, by the processor executing code, the trade instruction in view of the received interaction with the graphical user interface object.

5. The method of claim 1, wherein the graphical user interface object is configured to receive a plurality of symmetrical arrangements of single click actions, wherein each of the symmetrical arrangements of single click actions contributes to generation of a respective trade instruction.

6. The method of claim 1, wherein the graphical user interface object includes a plurality of petal-shaped nodes.

7. The method of claim 6, wherein the number of petal-shaped nodes is variable.

8. The method of claim 1, wherein at least some of the graphical user interface object is highlighted to represent a respective action that will be taken after receiving an interaction with the graphical user interface object.

9. The method of claim 1, further comprising de-selecting by the code executing in the processor at least a portion of the graphical user interface object in response to a click-selection.

10. The method of claim 1, wherein the graphical user interface further includes a keyboard for receiving at least one of numeric and alphabetic information.

11. The method of claim 1, wherein the at least portion of the populated data is centered around the respective location.

12. The method of claim 1, wherein the tactile input action includes at least one selected from a group consisting of:
    a single-click;
    a double-click;
    a single-click, drag and release;
    a hover; and
    a movement.

13. The method of claim 1, wherein the graphical user interface object is configured to receive input from a physical input device.

14. The method of claim 13, wherein the physical input device includes at least one from a group consisting of a keyboard, a mouse, a trackball, a touchscreen, a touchpad and an interactive display.

15. The method of claim 3, wherein the tactile input action includes at least one selected from a group consisting of:
    a single-click;
    a double-click; and
    a single-click and release.

16. A system for generating a trade instruction, the system comprising:
    a processor, a memory, and code executing in the memory wherein the processor executing the code is configured to:
       provide, via the trading screen that operates on the computing device, a plurality of interactive locations, each comprising less than the entire trading screen and each being configured to receive input from the computing device, wherein one of the interactive locations corresponds to a tradeable object of interest to a user;
       display, at the one interactive location, a current market condition of the tradeable object at a respective time, as a function of one or more data feeds received by the computing device from at least one other computing device over a communication network;

in response to received input at the one interactive location, cause a graphical user interface object to dynamically appear in the trading screen at the one interactive location;

populate, by the processor executing code on the basis of the one interactive location, the graphical user interface object with data relating to the market condition of the tradeable object at the respective time;

calibrate, by the processor executing code, the graphical user interface object with selectable options as a function the user's position in the tradeable object;

in response to a received user selection of an option in the calibrated graphical user interface object, generate, by the processor executing code, the trade instruction that is associated with the tradeable object; and transmit, by the processor executing code, the trade instruction to at least one other computing device that is configured to execute the trade instruction.

17. The system of claim 16, wherein the trade instruction includes a price, and a buy-side or a sell-side that is selected in view of the interactive location in the trading screen.

18. The system of claim 16, wherein the received user selection of the option is made by a tactile input action has-having a measurable size, and the trade instruction is further generated in view of the measurable size.

19. The system of claim 16, wherein the trading screen is further configured to receive an interaction with the graphical user interface object; and wherein the trade instruction is further generated in view of the received interaction with the graphical user interface object.

20. The system of claim 16, wherein the graphical user interface object is further configured to receive a plurality of symmetrical arrangements of single click actions, wherein each of the symmetrical arrangements of single click actions contributes to generation of a respective trade instruction.

21. The system of claim 16, wherein the graphical user interface object includes a plurality of petal-shaped nodes.

22. The system of claim 21, wherein the number of petal-shaped nodes is variable.

23. The system of claim 16, wherein at least some of graphical user interface is highlighted to represent a respective action that will be taken after receiving an interaction with the graphical user interface object.

24. The system of claim 16, wherein at least some of the graphical user interface is deselected in response to a click-selection.

25. The system of claim 16, wherein the graphical user interface further includes a keyboard for receiving at least one of numeric and alphabetic information.

26. The system of claim 16, wherein the at least portion of the populated data is centered around the respective location.

27. The system of claim 18, wherein the tactile input action includes at least one selected from a group consisting of:
 a single-click;
 a double-click;
 a single-click, drag and release;
 a hover; and
 a movement.

28. The system of claim 16, wherein the graphical user interface is configured to receive input from a physical input device.

29. The system of claim 28, wherein the physical input device includes at least one from a group consisting of a keyboard, a mouse, a trackball, a touchscreen, a touchpad and an interactive display.

30. The system of claim 16, wherein the tactile input action includes at least one selected from a group consisting of:
 a single-click;
 a double-click; and
 a single-click and release.

31. The method of claim 1, further comprising:
 establishing, using a processor and a communications interface that communicates over a network, a plurality of data communication connections to trading exchanges that support electronic transactions of tradeable objects, wherein the trading exchanges respectively implement at least one order execution algorithm to support the transactions;
 receiving, by a processor via the data connections, electronic market information from each of the trading exchanges, wherein the electronic market information corresponds to the tradeable objects; and
 populating by the code executing in the processor a plurality of graphical user interface objects with data relating to a current market condition of tradeable objects respectively associated with each of the trading exchanges.

32. The method of claim 31, further comprising: receiving in the graphical user interface an other tactile input action associated with one of the graphical user interface objects;
 causing by the code executing in the processor an other trade instruction to be constructed that is associated with one of the graphical user interface objects and the other tactile input action; and
 sending, by the processor, the other trade instruction to at least one computing device that is configured to execute the other trade instruction.

33. The method of claim 32, wherein the trade instruction is formatted in a message specification format, and the other trade instruction is formatted in a different message specification format.

34. The method of claim 1, further comprising altering, by the code executing in the processor, the graphical user interface object to include additional interactive options as the user interacts with the graphical user interface object.

35. The system of claim 16, further comprising a communications interface, wherein the processor and communications interface communicate over a network to establish a plurality of data communication connections to trading exchanges that support electronic transactions of tradeable objects, wherein the trading exchanges respectively implement at least one order execution algorithm to support the transactions;
 wherein the processor via the data connections, receives electronic market information from each of the trading exchanges, wherein the electronic market information corresponds to the tradeable objects; and
 wherein the processor executing the code populates a plurality of graphical user interface objects with data relating to a current market condition of tradeable objects respectively associated with each of the trading exchanges.

36. The system of claim 16, wherein the graphical user interface receives an other tactile input action associated with one of the graphical user interface objects;
 wherein the code executing in the processor causes an other trade instruction to be constructed that is associated with one of the graphical user interface objects and the other tactile input action; and wherein the code executing in the processor sends the other trade instruction to at least one computing device that is configured to execute the other trade instruction.

37. The system of claim 36, wherein the trade instruction is formatted in a message specification format, and the other trade instruction is formatted in a different message specification format.

38. The system of claim 16, wherein the graphical user interface object is altered, by the code executing in the processor, to include additional interactive options as the user interacts with the graphical user interface object.

* * * * *